(12) United States Patent
Trerotola

(10) Patent No.: US 11,199,692 B2
(45) Date of Patent: Dec. 14, 2021

(54) TELESCOPE MOUNT COUNTERWEIGHT WITH INTEGRATED BATTERY COMPARTMENT

(71) Applicant: Joseph Trerotola, West Haven, CT (US)

(72) Inventor: Joseph Trerotola, West Haven, CT (US)

( * ) Notice: Subject to any disclaimer, the term of this patent is extended or adjusted under 35 U.S.C. 154(b) by 378 days.

(21) Appl. No.: 16/381,205

(22) Filed: Apr. 11, 2019

(65) Prior Publication Data

US 2020/0326527 A1 Oct. 15, 2020

(51) Int. Cl.
*G02B 23/16* (2006.01)
*H01M 50/247* (2021.01)
*H01M 10/04* (2006.01)
*G02B 23/14* (2006.01)
*H01M 50/213* (2021.01)

(52) U.S. Cl.
CPC ........... *G02B 23/165* (2013.01); *G02B 23/14* (2013.01); *H01M 10/0436* (2013.01); *H01M 50/213* (2021.01); *H01M 50/247* (2021.01)

(58) Field of Classification Search
CPC ...... G02B 23/165; G02B 23/14; G02B 23/16; G02B 23/18; G02B 23/20; H01M 50/247; H01M 50/213; H01M 10/0436
See application file for complete search history.

(56) References Cited

U.S. PATENT DOCUMENTS

2014/0111853 A1* 4/2014 Xu .................... G02B 23/165
359/430

OTHER PUBLICATIONS iOptron, PowerWeight, https://www.ioptron.com/product-p/8128.htm, available for sale online at least as of Jul. 2017, accessed online Jun. 17, 2021 (Year: 2017).*
ADM Accessories, Dovetail Counterweights, https://admaccessories.com/product-category/v-series/dovetail-counterweights/, available for sale online at least as of Jun. 2017, accessed online Jun. 17, 2021 (Year: 2017).*
Meade Instruments, Instruction Manual ETX Observer Series, Jul. 2016 Rev 3 (Year: 2016).*

* cited by examiner

*Primary Examiner* — Stephone B Allen
*Assistant Examiner* — Adam W Booher
(74) *Attorney, Agent, or Firm* — Finch & Maloney PLLC

(57) ABSTRACT

A telescope mount assembly includes a hub section, a motor assembly, one or more legs extending away from the hub section, and a counterweight coupled to a portion of the hub section. The hub section includes one or more extensions that are each configured to rotate or translate about a fixed axis. The motor assembly is designed to rotate or translate one or more of the extensions. The counterweight includes a battery compartment configured to hold one or more batteries.

20 Claims, 3 Drawing Sheets

TELESCOPE MOUNT COUNTERWEIGHT WITH INTEGRATED BATTERY COMPARTMENT

BACKGROUND

Telescope mounts are mechanical structures designed to support a telescope. Some telescope mounts also include motorized segments to accurately point the telescope and smoothly move the telescope, such as for tracking the position of a celestial body in the night sky. Such motorized segments require power that is typically provided by one or more batteries. Telescope mounts typically also include one or more removable counterweights to provide balance to the overall structure when the telescope is attached. Traveling with the many accessories used on a telescope mount can be burdensome, as each accessory can be heavy and bulky.

BRIEF DESCRIPTION OF THE DRAWINGS

Features and advantages of embodiments of the claimed subject matter will become apparent as the following Detailed Description proceeds, and upon reference to the Drawings, in which:

Figure 1:
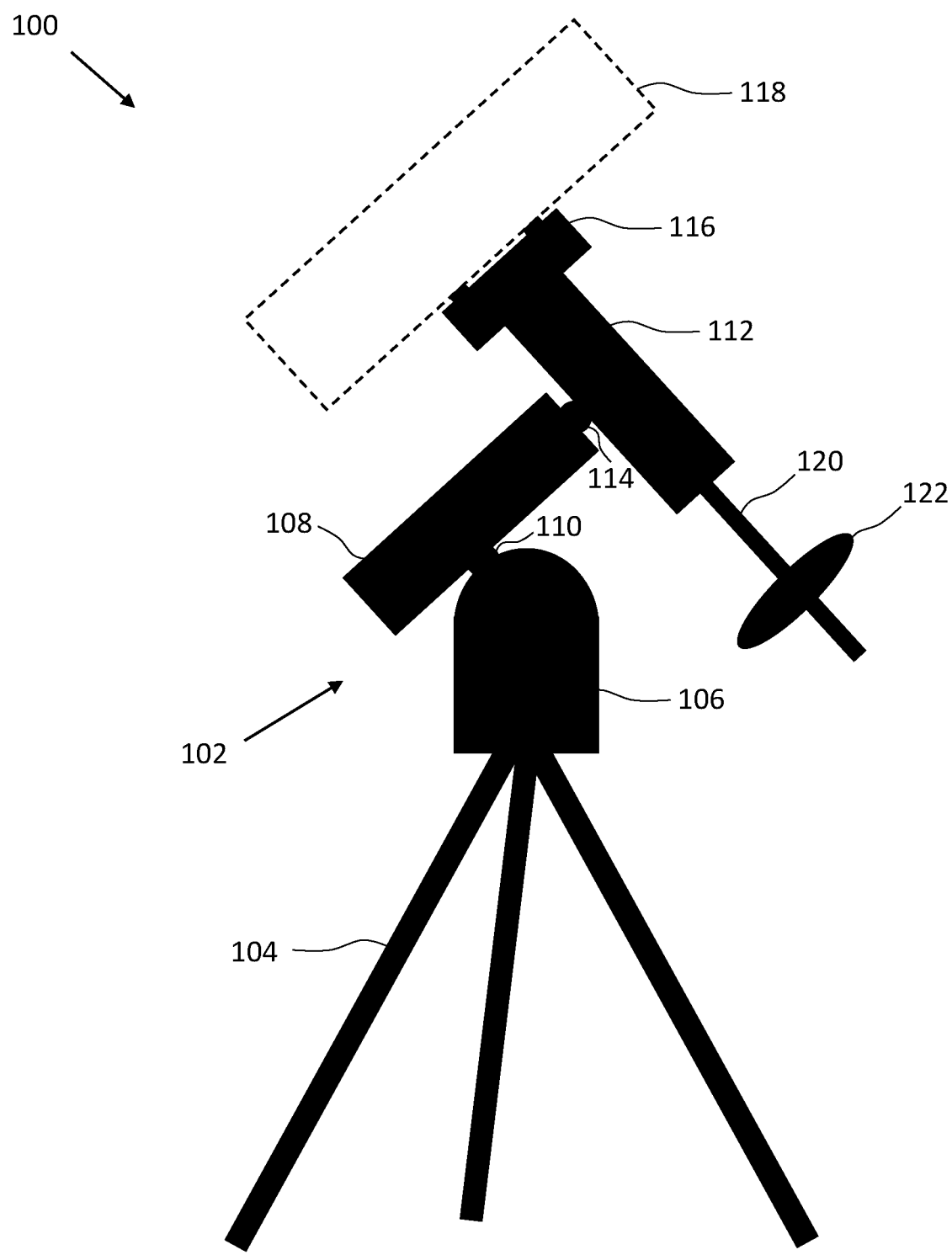
FIG. 1 illustrates a telescope mount assembly, in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

As noted above, there are some non-trivial issues associated with storing and carrying various telescope mount accessories. One issue is that one or more batteries are often required to power various components on the telescope mount, yet the batteries themselves can be heavy or inconvenient to transport separately from the other components used on the telescope mount. The telescope mount itself is heavy, and typically includes removable components such as counterweights, cameras, etc., that are each also heavy.

Techniques and designs are provided herein that mitigate at least some of the issues discussed above. According to embodiments disclosed herein, the batteries are integrated with the counterweight to provide a single component that serves dual purposes. The counterweight may include a battery compartment for holding one or more removable batteries, or the counterweight may have an internal rechargeable battery.

In an example embodiment, a telescope mount assembly includes a hub section, a motor assembly, one or more legs extending away from the hub section, and a counterweight coupled to a portion of the hub section. The hub section includes one or more extensions that are each configured to rotate or translate about a fixed axis. The motor assembly is designed to rotate or translate one or more of the extensions. The counterweight includes a battery compartment configured to hold one or more batteries.

In another example embodiment, a counterweight for use on a telescope assembly includes a body comprising a metal or hard plastic and a battery compartment integrated into a portion of the body. The battery compartment is designed to hold one or more batteries.

Various operations may be described herein as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in an order different from the described example. Various additional operations may be performed, and/or described operations may be omitted in additional examples.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y.

Spatially relative terms, such as "beneath," "below," "lower," "above," "upper," and the like, may be used herein for ease of description to describe one element or feature's relationship to another element (s) or feature (s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates an example telescope mount assembly 100, according to an embodiment. Generally, mount assembly 100 includes a hub section 102 that may include numerous other components designed to support and move a telescope 118, and one or more legs 104 coupled to hub section 102 and extending away from hub section 102. One or more legs 104 may include three legs in a tripod arrangement, as illustrated. One or more legs 104 are designed to support the weight of both hub section 102 and any telescope 118 mounted to hub section 102.

As noted above, hub section 102 may represent many components of mount assembly 100 used to accurately position and support telescope 118. For example, hub section 102 includes a body segment 106 that may house various electrical or mechanical components for operating mount assembly 100. Hub section 102 may also include one or more extensions designed to rotate or translate about a fixed axis. For example, a first extension 108 may be coupled to body segment 106 via coupling point 110 and may rotate about an axis passing through coupling point 110 or may translate along an axis passing through coupling point 110. A second extension 112 may be coupled to first extension 108 via coupling point 114 and may rotate about an axis passing through coupling point 114 or may translate along an axis passing through coupling point 114. The arrangement described above for first extension 108 and second extension 112 is merely one example and other coupling arrangements are possible. In some embodiments, second extension 112 includes a coupling stage 116 for securing telescope 118 to mount assembly 100.

In some embodiments, each of first extension 108 and second extension 112 includes a motor assembly for moving the corresponding extension. In some other embodiments, a motor assembly is included within body segment 106 for controlling movement of first extension 108 and second extension 112. In still other embodiments, a motor assembly is present within first extension 108 and controls the movement of second extension 112. Generally, the motor assembly may be located anywhere on hub section 102.

According to some embodiments, a rod 120 extends away from a remainder of the hub section 102 and includes a counterweight 122 coupled to a portion of rod 120. In one example, rod 120 is coupled to second extension 112 and extends away from second extension 112 along a length of second extension 112. Counterweight 122 may be provided to counterbalance the weight caused by telescope 118 on mount assembly 100. Accordingly, depending on the weight of telescope 118 and the size and weight of mount assembly 100, one or more counterweights of varying weight can be used to provide proper counterbalance. Counterweight 122 may have an annulus shape, as illustrated, that slides over rod 120. In some other embodiments, counterweight 122 clamps on to a portion of rod 120, or another portion of hub section 102. There is generally no limitation to the size or shape of counterweight 122.

According to an embodiment, counterweight 122 includes a battery compartment designed to hold one or more batteries. The batteries may include standard size batteries such as AAA, AA, C, D, or 9V batteries. Accordingly, the battery compartment may be located on an external portion of counterweight 122 such that the batteries can be removed and replaced. In some other embodiments, the battery compartment is integrated within counterweight 122 and includes a rechargeable battery. Examples of rechargeable batteries include lithium ion (Li-ion), nickel-metal hydride (NiMH), nickel-cadmium (NiCd), and lithium-ion polymer (Li-ion polymer).

Although FIG. 1 illustrates the use of an annulus-shaped counterweight 122, this is only one example type of counterweight (sometimes referred to as a "Losmandy" counterweight). Another commonly-used counterweight design is a dovetail design where a weight is mounted to a clamp that can slide along a rail in order to adjust the balance of mount assembly 100. The battery compartment may be included in any counterweight design, including the dovetail design. For ease of discussion, only the annulus-shaped counterweight design is illustrated in the following figures.

Figure 2:
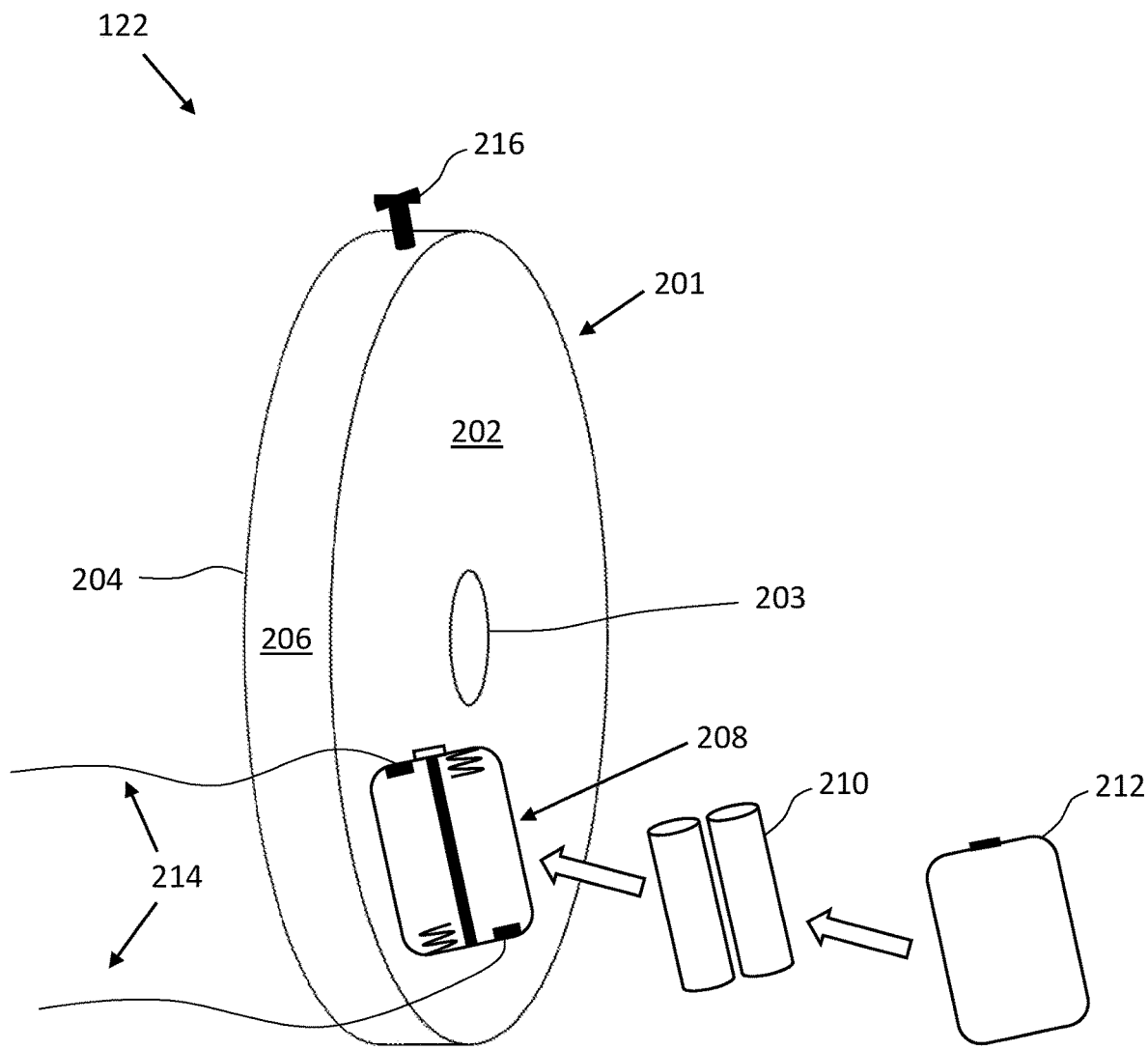
FIG. 2 illustrates a counterweight having a battery compartment, in accordance with some embodiments of the present disclosure.

FIG. 2 illustrates a close-up view of counterweight 122. This example counterweight has an annulus shape, but as mentioned above, other examples could have other shapes. Counterweight 122 includes a body 201 having a first surface 202 and an opposite second surface 204 with a curved surface 206 between first surface 202 and second surface 204. An opening 203 may pass through both first surface 202 and second surface 204 to facilitate sliding counterweight 122 over rod 120 or another structure on mount assembly 100. Body 201 may be made of any metal or hard plastic material. Examples of hard plastic materials include polyethylene terephthalate (PET), polyetheretherketone (PEEK), and polycarbonate (PC).

According to an embodiment, counterweight 122 includes a battery compartment 208 disposed on or within body 201. Battery compartment 208 may be coupled directly to surface 202 or may be set into surface 202. In some embodiments, battery compartment 208 includes one or more sections for placing a standard size battery 210 (AA, AAA, etc.) Accordingly, batteries 210 may be removed and/or replaced within battery compartment 208 by externally accessing battery compartment 208. In some embodiments, proprietary battery sizes or types are used with battery compartment 208. Battery compartment 208 may include a cover 212 for protecting batteries 210 and to keep batteries 210 from accidentally falling out of battery compartment 208. Cover 212 may include one or more clips that snap into corresponding grooves on battery compartment 208 to secure cover 212 over battery compartment 208. In some embodiments, the inclusion of compartment 208 and batteries 210 may disrupt the weight distribution of counterweight 122. Accordingly, counterweight 122 may include differently weighted portions to provide weighted balance across the whole of counterweight 122.

One or more wires 214 may be connected to battery compartment 208 to carry electrical current to one or more components of mount assembly 100. For example, wires 214 may provide current to a motor assembly disposed in hub section 102, and/or to any other electronic components coupled to hub section 102, such as a camera. Wires 214 may connect to one or more electrical ports on hub 102 to provide current to any electrical components in or on hub 102. According to an embodiment, the location of counterweight 122 on a portion of hub section 102 allows for counterweight 122 to correspondingly move along with the movement of either first extension 108 or second extension 112. The synchronized movement prevents wires 214 from becoming tangled or stretched as the components move.

In another embodiment, wires 214 run through an inner portion of rod 120 such that the wires are not visible from the outside. Such a design may be facilitated by using an electrical connector on body 201 that connects with a corresponding electrical connector on rod 120 when counterweight 122 is placed over rod 120. Wires 214 may run from the electrical connector on rod 120 through rod 120 to provide current to a motor assembly disposed in hub section 102, and/or to any other electronic components coupled to hub section 102.

According to some embodiments, counterweight 122 includes a fastener 216 (e.g., a screw, bolt, pin, wire, etc.) that can be twisted, or otherwise manipulated, to tighten counterweight 122 in place over rod 120. Fastener 216 may extend through body 201 and into opening 203 to tighten counterweight 122 against any structure within opening 203. In other designs, a fastener may be used to tighten the counterweight onto an edge or a side of a structure.

According to some embodiments, battery compartment 208 may be attached to first surface 202 of counterweight 122 using an adapter structure or other fastening structure to secure battery compartment 208 in place. The fastening structure may be a certain type of glue or epoxy that holds battery compartment 208 in place on surface 202. Other examples of fastening structures include clamping structures to hold battery compartment 208 in place on surface 202 or magnets that attract battery compartment 208 either towards body 201 (if body 201 is a ferromagnetic material) or towards another magnet placed on the opposite second surface 204.

Figure 3:
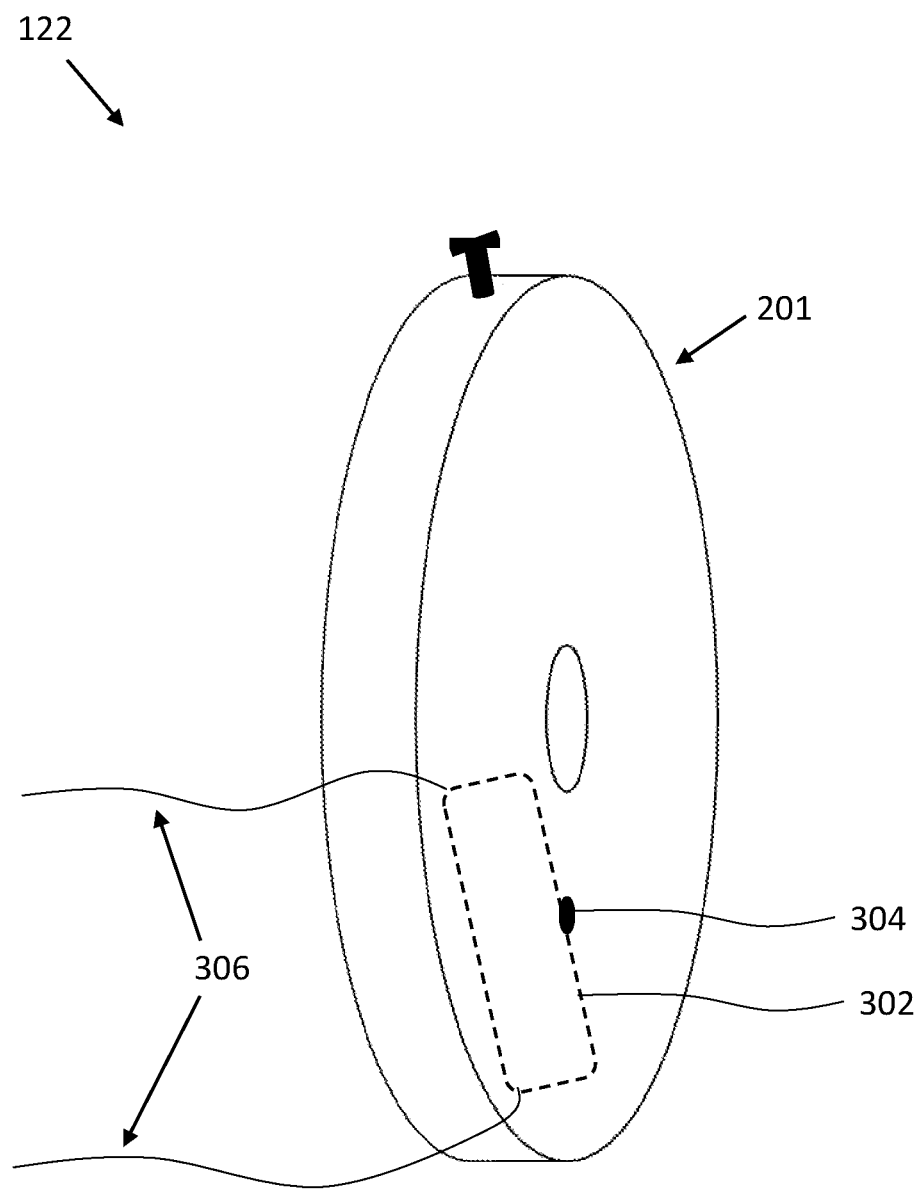
FIG. 3 illustrates a counterweight having an internal battery, in accordance with some embodiments of the present disclosure.

FIG. 3 illustrates another embodiment of counterweight 122 that includes many of the same features from the embodiment illustrated in FIG. 2, and as such, the features are not discussed again here. In another embodiment, counterweight 122 includes an internal battery compartment 302 that houses one or more rechargeable batteries. Internal battery compartment 302 may be entirely integrated within the thickness of body 201 such that internal battery compartment 302 is not accessible from outside of body 201. In some embodiments, the inclusion of internal battery compartment 302 and the one or more rechargeable batteries may disrupt the weight distribution of counterweight 122.

Accordingly, counterweight 122 may include differently weighted portions to provide weighted balance across the whole of counterweight 122.

According to an embodiment, body 201 may include an electrical port 304 used to charge the one or more rechargeable batteries present in internal battery compartment 302. Electrical port 304 may be shaped to fit any size plug or jack to supply charging current from a wall outlet or other power source. In some other embodiments, the one or more rechargeable batteries present in internal battery compartment 302 may be charged wirelessly. One or more wires 306 may be coupled to internal battery compartment 302 to carry electrical current to one or more components of mount assembly 100. For example, wires 306 may provide current to a motor assembly disposed in hub section 102, and/or to any other electronic components coupled to hub section 102, such as a camera. Wires 306 may connect to one or more electrical ports on hub 102 to provide current to any electrical components in or on hub 102. In another embodiment, wires 306 run through an inner portion of rod 120 such that the wires are not visible from the outside, as discussed above with reference to FIG. 2.

Numerous specific details have been set forth herein to provide a thorough understanding of the embodiments. It will be understood in light of this disclosure, however, that the embodiments may be practiced without these specific details. In other instances, well known operations and components have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A telescope mount assembly, comprising:
   a hub section having one or more extensions that are each configured to rotate or translate about a fixed axis;
   one or more motor assemblies disposed in the hub section and configured to rotate or translate the one or more extensions;
   one or more legs extending away from the hub section, and configured to support the hub section and a telescope; and
   a counterweight coupled to a portion of the hub section, the counterweight including a battery compartment configured to hold one or more removable batteries, wherein the counterweight is configured to provide balance to the telescope mount assembly when the one or more batteries have been removed.

2. The telescope mount assembly of claim 1, wherein the counterweight is coupled to the portion of the hub section via a rod extending away from a remainder of the hub section.

3. The telescope mount assembly of claim 2, wherein the counterweight has an annulus shape and is configured to slide over the rod.

4. The telescope mount assembly of claim 2, wherein the counterweight is configured to clamp on to a portion of the rod.

5. The telescope mount assembly of claim 1, wherein the battery compartment is accessible from outside the counterweight.

6. The telescope mount assembly of claim 1, wherein the battery compartment is set into a surface of the counterweight.

7. The telescope mount assembly of claim 1, wherein the battery compartment is configured to hold AAA, AA, C, D, or 9V batteries.

8. The telescope mount assembly of claim 1, further comprising one or more wires coupled to the battery compartment, wherein the one or more wires are configured to electrically couple with corresponding one or more ports on the hub section.

9. The telescope mount assembly of claim 8, wherein the one or more wires are configured to provide current to the one or more motor assemblies.

10. The telescope mount assembly of claim 1, wherein the counterweight has a dovetail design.

11. The telescope mount assembly of claim 1, wherein the battery compartment is attached to a surface of the counterweight using a fastener structure.

12. A telescope mount assembly, comprising:
    a hub section having one or more extensions that are each configured to rotate or translate about a fixed axis;
    one or more motor assemblies disposed in the hub section and configured to rotate or translate the one or more extensions;
    one or more legs extending away from the hub section, and configured to support the hub section and a telescope;
    a counterweight coupled to a portion of the hub section via a rod extending away from a remainder of the hub section, the counterweight including a battery compartment configured to hold one or more batteries; and
    one or more wires electrically coupled to the battery compartment and running through the rod.

13. A counterweight configured for use on a telescope assembly, the counterweight comprising:
    a body comprising a metal or hard plastic; and
    a battery compartment integrated in or on the body, wherein the battery compartment is configured to hold one or more batteries;
    wherein the counterweight is configured to provide balance to a telescope mount assembly when the one or more batteries have been removed.

14. The counterweight of claim 13, wherein the body has an annulus shape.

15. The counterweight of claim 13, wherein the body is shaped for use with a dovetail design.

16. The counterweight of claim 13, wherein the battery compartment is accessible from outside the body.

17. The counterweight of claim 13, wherein the battery compartment is set into a surface of the body.

18. The counterweight of claim 13, wherein the battery compartment is configured to hold AAA, AA, C, D, or 9V batteries.

19. The counterweight of claim 13, further comprising a fastener configured to tighten the counterweight onto a support structure.

20. The counterweight of claim 13, wherein the battery compartment is attached to a surface of the body using a fastener structure.

* * * * *